United States Patent [19]

Proffitt et al.

[11] Patent Number: 4,864,578
[45] Date of Patent: Sep. 5, 1989

[54] SCANNABLE LASER WITH INTEGRAL WAVEMETER

[75] Inventors: William P. Proffitt, Cupertino; Gerald H. Williams, Sunnyvale; James L. Hobart, Los Altos Hills; Thomas F. Johnston, Sunnyvale, all of Calif.

[73] Assignee: Coherent, Inc., Palo Alto, Calif.

[21] Appl. No.: 26,068

[22] Filed: Mar. 16, 1987

Related U.S. Application Data

[63] Continuation of Ser. No. 484,153, Apr. 12, 1983, abandoned.

[51] Int. Cl.$^4$ .............................................. H01S 3/10
[52] U.S. Cl. ...................................................... 372/20
[58] Field of Search ........................................ 372/20

[56] References Cited

U.S. PATENT DOCUMENTS 4,150,342  4/1979  Johnston, et al. ................. 331/94.5

OTHER PUBLICATIONS

Kato et al.; "Tuning A Dye Laser Wavelength by Rotary Dispersive Elements"; *Optics Communications; v. 5, No. 2; pp. 134–136; May, 1972.*
P. Juncar et al., *Optics Communications*, v. 14, Aug., 1975, pp. 438–441, "A New Method for Frequency Calibration and Control of a Laser".
J. Hall et al., *Applied Physics Letters*, v. 29, Sept. 15, 1976, pp. 367–369, "Interferometric Real-Time Display of CW Dye Laser Wavelength with Sub-Doppler Accuracy".
F. Kowalski et al., *Journal of the Optical Society of America*, v. 66, Sept., 1976, pp. 965–966, "Digital Wavemeter for CW Lasers".
J. Hall et al., editor, Laser Spectroscopy III, Springer-VerLag, N.Y., 1977, pp. 410–426.
C. Pollock, *Applied Optics*, v. 18, June 15, 1979, pp. 1907–1912, "Computer Controlled CW Laser Spectrometer".
M. Coulombe et al. *Applied Optics*, v. 18, May 15, 1979, pp. 1505–1512, "Linear Scan Control of Turnable Lasers Using a Scanning Fabry–Perot".
R. Salimbeni et al., *Optics Letters*, v. 5, Feb., 1980, pp. 39–41, "Compact High-Accuracy Wavemeter".
J. Snyder, Proceedings of SPIE, v. 288, April, 1981, pp. 258–262, "Fizeau Wavemeter".
A. Fischer et al., *Optics Communications*, v. 39, Nov. 1, 1981, pp. 277–282, "Computer Controlled Fabry–Perot Wavemeter".
N. Konishi et al., Applied Physics, v. 25, 1981, pp. 311–316, "High Precision Wavelength Meter with Fabry–Perot Optics".
L. Lee et al., *Optics Letters*, v. 6, Dec., 1981, pp. 610–612, "Multiple-Wedge Wavemeter for Pulsed Lasers".
P. Juncar, et al., Review of Scientific Instruments, v. 53, July, 1982, pp. 939–948, "Instrument to Measure Wave Numbers of CW and Pulsed Laser Lines: The Sigmameter".
T. Johnston et al., *Applied Optics*, v. 21, July 1, 1982, pp. 2307–2316, "Powerful Single Frequency Ring Dye Laser Spanning the Visible Spectrum".
J. Heimcke et al., *Applied Optics*, v. 21, May 1, 1982, pp. 1686–1694, "Dye Laser Spectometer for Ultrahigh Spectral Resolution; Design and Performance".
"Burleigh Wavemeter", Burleigh Instruments, Inc., Fishers, N.Y. 14453, May, 1981.
"The Lasertechnics Model 100 Fizeau Wavemeter"-'Lasertechnics, Albuquerque, N.M. 87109, Nov., 1982.

*Primary Examiner*—William L. Sikes
*Assistant Examiner*—Robert E. Wise
*Attorney, Agent, or Firm*—Limbach, Limbach & Sutton

[57] ABSTRACT

A scannable dye laser is provided with an integral wavemeter under computer control. The wavemeter has improved fine and coarse readout components. Incremental laser scans are precisely linked together to provide long, continuous frequency scans. The fine readout of the wavemeter provides a means for accurately piecing together the incremental scans.

18 Claims, 3 Drawing Sheets

SCANNABLE LASER WITH INTEGRAL WAVEMETER

This is a continuation of application Ser. No. 484,153, filed Apr. 12, 1983, now abandoned.

TECHNICAL FIELD

This invention relates to scannable lasers, and in particular to a computer-controlled lasers having high resolution (narrow linewidth) over a broad frequency scan range.

BACKGROUND ART

With the development in the early 1970's of frequency-stabilized, single-frequency dye lasers, and particularly with the introduction of commercially-available versions capable of a 30 GHz continuous scan range, this type of laser became the standard tool for high resolution spectroscopy. Once the frequency stability of this source was brought under electronic control, it became possible to develop its other aspects. In particular the laser frequency-scanning elements have been put under computer control to allow very long scans (1000 GHz), and wavemeters, or means of precisely monitoring the laser output frequency, have been developed.

Use of such wavemeters is one approach to solve the "search mode" problem. The electronically-stabilized laser's linewidth is typically 1 MHz or less. Even after setting the output wavelength with a typical low-resolution laboratory spectrometer to within 1'Å (~100 GHz), there are still $10^5$ resolution elements to search over to find a desired 1 MHz feature.

Once the usefulness in laser spectroscopy of a wavemeter of $1 \times 10^{-6}$ or better precision was demonstrated, others suggested additional alternative designs and improvements for such instruments. Today there are several laser-wavemeter instruments commercially available.

But existing wavemeters have definite drawbacks. They are stand-alone devices, and while under the control of a computer, are not integrated with the scannable dye laser. They are large, complicated, and expensive and have stringent optical alignment requirements to be accurate.

DISCLOSURE OF THE INVENTION

It is therefore an object of the invention to provide an improved scannable laser system, which has an integral wavemeter, all under computer control.

Another object of the invention is to provide an improved wavemeter for use with a scannable laser.

Another object of the invention is to provide an improved scannable laser system which can be quickly and accurately tuned over a broad range of wavelengths.

Another object of the invention is to provide an improved wavemeter for a scannable dye laser which has improved coarse and fine wavemeter components.

In accordance with the present invention, an improved wavemeter is provided which is an integrated part of a scannable dye laser, under computer control. The wavemeter has improved coarse and fine read-out components. The fine-wavelength readout is provided by a stationary frequency reference which comprises a stable reference etalon, whose frequency stability is determined solely by the expansion coefficient of the stable material forming its mirror spacers and the minimum residual temperature changes of this material in a temperature-stabilized vacuum environment. Unlike other wavemeters its stability is not degraded by the use of PZT elements as part of the mirror spacer, or air-pressure changes, or input angle change introduced to allow readout of the reference frequency.

The coarse wavelength readout is provided by the utilization of optically-active quartz crystals. The amount of polarization rotation is measured as a sample light beam passes along its axis. This is correlated to the wavelength of the light by the computer. A pair of optically-active crystals is preferably utilized, with one crystal being slightly longer than the other. The difference in length between the two crystals is chosen such that the angular difference in polarization rotation of light beams passing through each of the two crystals is less than 180°, over the wavelength read out range of the wavemeter. This angular rotation difference is used to assign the order-numbers, for light passing through and rotated by, the two crystal lengths. These "order-numbers" are defined as the number of redundant, or 180° rotations, of the light beam through each of the two crystals.

In accordance with another aspect of the invention, the elements of the wavemeter, and in particular the stable reference etalon, enable long scans to be made continuously and linearly. A long scan consists of short incremental scans pieced together under control of the computer. The system also allows for automatic error correction in the frequency label of the spectroscopic data, by repeating data containing mode-hops or frequency discontinuities.

By integrating the wavemeter with the scannable dye laser, under computer control, economics in hardware and operation result compared with prior art systems. Additionally, experiments can be more flexible and can be conducted far more rapidly than prior art systems. Time-sharing of the laser between experiments also becomes practical.

BEST MODE FOR CARRYING OUT THE INVENTION

Figure 1:
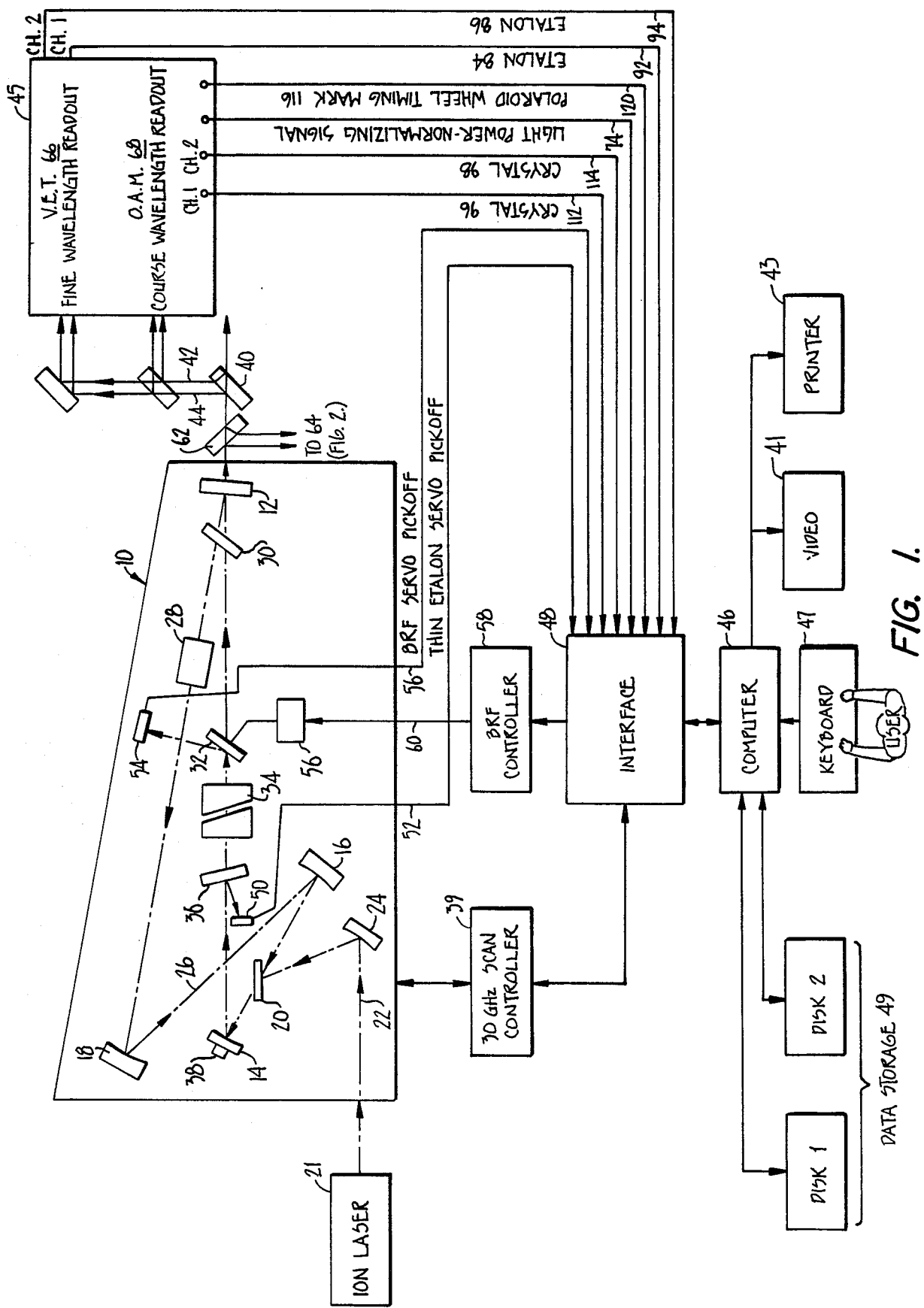
FIG. 1 is a block schematic illustration of the integrated ring dye laser/wavemeter system of the present invention.

The optical schematic of a typical ring dye laser 10, such as the Coherent, Inc., Model 699-21, is shown in FIG. 1. The optical cavity comprises four mirrors 12, 14, 16 and 18 forming a figure-eight configuration. The purpose of the figure-eight configuration is to keep the fold angles small, allowing astigmatic compensation of concave mirrors 14, 16 and 18. The three mirrors 14, 16 and 18 are all of high reflectivity while mirror 12 is the output coupler allowing some of the ring dye laser light 13 to pass through it.

The two concave mirrors 14 and 16 focus the dye laser beam to a narrow waist at which point, an unsupported liquid dye stream 20 is injected in the well-known manner, into the ring laser path. The liquid dye is the active lasing material in the laser. The dye stream 20 is optically pumped by another laser 21 such as a continuous wave argon ion laser. Its output beam 22 is focused by a pump mirror 24 to intersect the dye stream 20.

Reflecting mirrors 16 and 18 are concave to provide an auxiliary focus point or "waist" 26 within the dye laser cavity. Auxiliary waist 26 can be used to mount intercavity experiments, such as frequency doubling in a non-linear crystal to produce suitable ultra-violet radiation. Unidirectional lightwave propagation is provided by optical diode 28, which is described in greater detail in U.S. Pat. No. 4,272,158 entitled "Broadband Optical Diode for a Ring Laser."

There are several optical tuning elements within the ring dye laser optical cavity 10. Coarse tuning of the dye laser is done by a birefringent filter 32. Such a filter is described in U.S. Pat. No. 3,868,592 entitled "Improved Tuning Apparatus for a Dye Laser."

Additional cavity tuning elements include a thick etalon 34 having a 10 GHz free spectral range (FSR), a thin etalon 36 having a 225 GHz FSR, a tipping Brewster plate 30 and a piezo-electric drive 38 for fold mirror 14. Thick etalon 34 is described in U.S. Pat. Nos. 4,081,760 and 4,097,818. These three optical elements, as well as the tipping Brewster plate 30, are controlled by controller 39 to tune to and maintain the dye laser at a predetermined output frequency, despite momentary perturbations of laser operation. Such a control system is described in U.S. Pat. Nos. 4,150,342 and 4,092,530. A beam splitter 40, positioned outside of the ring laser cavity 10, provides a pair of low intensity light beams 42 and 44 which are utilized in the wavemeter 45 which will be described. Tipping Brewster plate 30 is described in U.S. Pat. No. 4,268,800.

The combination of the Brewster plate 30, the thick etalon 34, thin etalon 36, and birefringent tuner 32 is sometimes referred to as the "tunable filter stack." Under the control of controller 39, dye laser 10 is conventionally capable of continuous scans of 30 GHz with less than 1 MHz resolution or stability control.

To provide continuous scans of up to 10 THz (10,000 GHz) with 1 MHz resolution, additional components and circuitry are provided within dye laser 10. This allows external control of the filter stack by a computer 46, through interface electronics 48. For example, computer 46 in one actual embodiment is an Apple II, and has associated with it a printer 43, a video display 41, an operator's keyboard 47, and disk storage 49.

Specifically, a servo sensor 50 is provided to provide a servo pick-off signal 52 indicative of the position of the thin etalon 36. Since the light reflected from the thin etalon 36 is at a minimum when the peak transmission frequency of the etalon is aligned with the lasing frequency, sensor 50 is merely a light detector (photocell). A servo sensor 54 is also added for the birefringent tuning filter (BRF) 32, to provide a BRF position servo pick-off signal 56 for the computer 46. Similarly, the reflected light off the BRF 32 is a minimum when its peak transmission frequency is aligned with the lasing frequency, so this sensor 54 is also a photocell. A stepping motor 56 positions the BRF 32 under the control of computer 46 through BRF controller 58 and control signal line 60.

Figure 2:
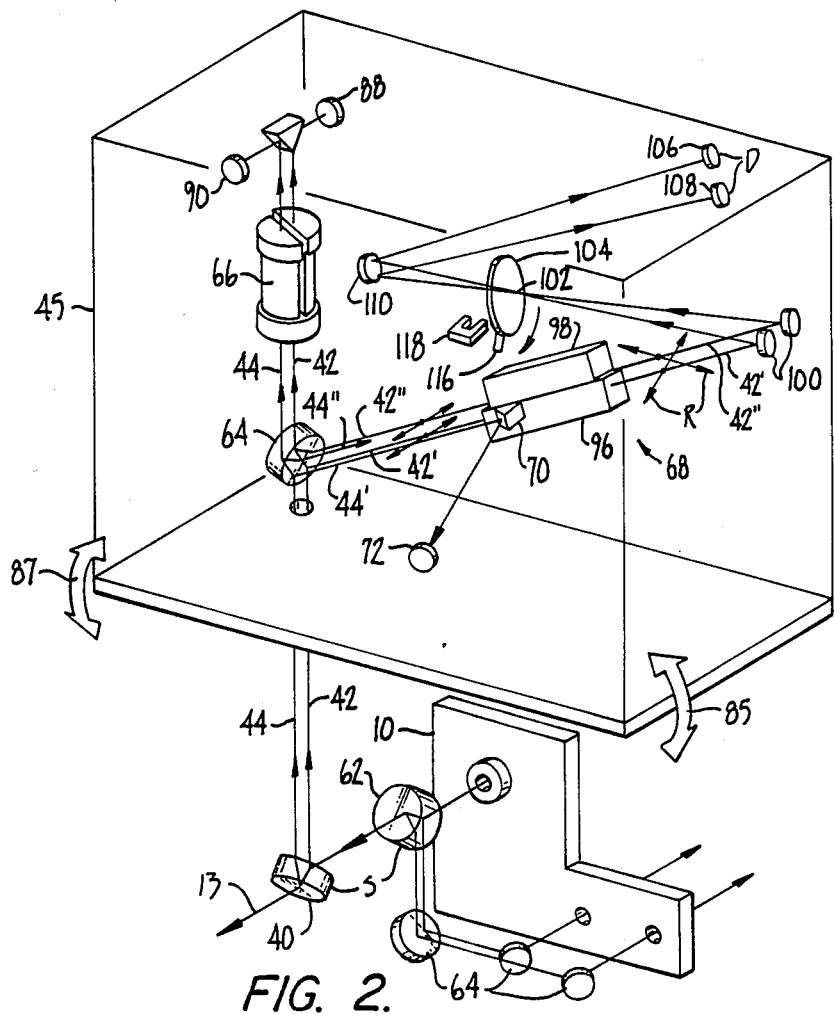
FIG. 2 is a perspective view of the improved wavemeter of the present invention.

Details of the improved wavemeter of the present invention are shown in FIG. 2. One pair of samples of the laser output beam 13 is picked off by beam splitter 62 and directed to the frequency servo optics, by mirrors 64, and reflected back within laser 10, in the conventional manner. Another pair of sample beams is picked-off by beam splitter 40 and directed to the wavemeter 45 as beams 42 and 44.

The first optic in the wavemeter 45 is beam splitter 64 at Brewster's angle of incidence to the incoming beam. Beams 42 and 44 pass through beam splitter 64 and are directed to the fine wavelength readout device, the vernier etalon assembly (VET) 66. Beam 44 is reflected off the front and back surfaces of beam splitter 64 to form two beams 44' and 44". Beam 44" is not used. Beam 44' is reflected off of mirror 70 to a detector 72. The signal 74 (FIG. 1) from detector 72 is used for light intensity normalization, in the conventional manner, within the wavemeter 45.

Beam 42 is reflected off the front and back surfaces of beam splitter 64 to form beams 42' and 42", which are directed to the coarse wavelength readout device, the optical activity monochromator (OAM) 68. Beams 42' and 42" are parallel, with a precisely defined input polarization orientation to the OAM 68 which is described below.

Figure 3:
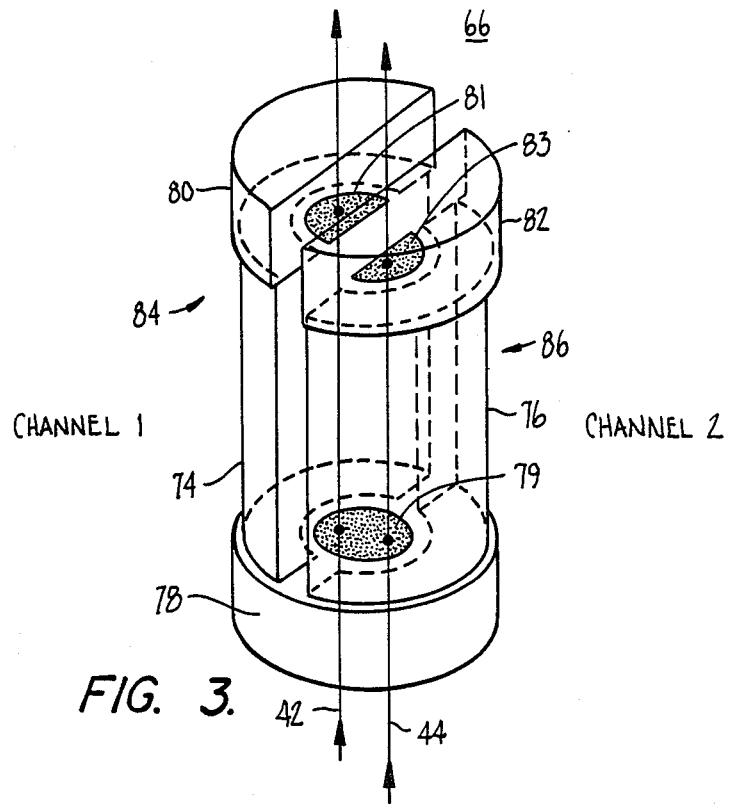
FIG. 3 is a perspective view of the fine wavelength read out component, the vernier etalon, of the wavemeter of FIG. 2.

The high accuracy part of the wavemeter is provided by the VET 66, which is shown in greater detail in FIG. 3. The VET 66 is constructed from a tubular Zerodur ™ etalon-spacer sliced along its axis into two C-shape cross sectional pieces 74 and 76. Zerodur ™ has a coefficient of thermal expansion of $<2\times10^{-7°}$ $C^{-1}$. The two pieces 74 and 76 are finished so that the length of piece 76 is 5% shorter than piece 74.

One end of each of these spacers is optically-contacted to a common end-mirror 78. "D"-shaped mirrors 80 and 82 are contacted on each of the other ends of pieces 74 and 76 respectively, reforming the original cylindrical shape and forming two etalons 84 and 86, Channel 1 and Channel 2, respectively. Mirror 78 is coated at 79 and mirrors 80 and 82 at 81 and 83 respectively. VET 66 is temperature-stabilized to 0.03° C. inside an evacuated housing (not shown).

The two parallel beams 42 and 44 from beamsplitter 64 probe the etalons 84 and 86 formed by each half of this VET assembly 66. The entire wavemeter is mounted on a tilt plate, and the alignment of the etalons to the beams to <0.3 milliradian incidence angle (or a cosine error of $<\frac{1}{2}\times10^{-7}$) is accomplished by tilting to maximize the transmission through the etalons. The tilt adjust, about an axis axial to the dye laser 10, is illustrated by arrow 85 and about an axis transverse to laser 10 by arrow 87. As the etalons are of moderate finesse (F=7), this is a more sensitive alignment than possible, for similar space limitations, with the tracer beam technique of HeNe laser fringe-counting wavemeter designs, or other conventional wavemeter designs.

This improvement in alignment accuracy in the present invention can be understood as follows. Most wavemeters are interferometric in nature, that is, the light beam is directed along an axis defined by two mirrors which are optically parallel, which generates multiple reflected beams. These beams add up in phase, and produce a detectable transmission peak through the interferometer, when an integral number of wavelengths fits in the space between the mirrors. If the light beam is directed not along the instrument axis, but at a small angle $\theta$ with respect to it, the path length is increased by a factor $1/\cos\theta \simeq (1+(\theta^2/2))$ ($\theta$ in radians), giving a fractional error in the wavelength measurement of $+(\theta^2/2)$, called the "cosine error."

The conventional means to reduce this error, by aligning the beam along the axis of the interferometer, is to view the patterns of spots transmitted through the interferometer, and then tip either the interferometer or the input beam direction, to collapse the "fan" of multiply-reflected spots, to give a single transmitted spot. As is well known in the prior art, the number of spots seen is roughly equal to the "finesse", F, of the instrument. See M. Born and E. Wolf, *Principles of Optics*, MacMillan Co., N.Y., 1964, Sec. 7.6. The finesse increases with the mirror reflectivity, and to use a concrete example, is, in the present invention, $F \simeq 7$.

Then the alignment tolerance possible by collapsing the fan of transmitted spots, can be estimated using the criterion that a displacement of 1/5 of a spot diameter, of the 7th spot from the first is detectable. For a 1 mm diameter input spot diameter, and a pair of interferometer mirrors spaced by 25 mm (the present case) this gives an alignment angle of $$\theta < \frac{1/5 \text{ mm}}{7 \times 25 \text{ mm}} = 1 \text{m rad},$$

or a wavelength (cosine) error of $< \frac{1}{2} \times 10^{-6}$.

It is desirable to reduce this error by at least an order of magnitude, to make the alignment error negligible in the overall wavelength error. That is done in the present invention by making use of the scan control of the input frequency from the laser 10. First the VET 66 is aligned by conventional means, to make $\theta$ small, $\theta < 1$ milliradians. Equation (27) of Born and Wolf can be manipulated to show that if $V_0$ is the frequency of a transmission peak when the interferometer (etalon) is aligned ($\theta=0$) and $V_E(0)$ the frequency when there is some misalignment angle, then $$V_E(\theta) - V_0 = V_0 \theta^2 / 2 \tag{1}$$

so as the etalon is tipped away from normal incidence in either direction, the local transmission peak, always moves to higher frequency.

If one were to sit at a fixed input frequency, and attempt to align the etalon 66 by tilting it to maximize the transmission, this could maximize at a non-zero incidence angle. This happens if the fixed input frequency lies above that of the local peak and the tilt carries the frequency of that peak (by Eq. (1)) through the input frequency. By scanning the input frequency, at fixed, small tilt angles $\theta$, the approximate frequency of the local transmission peak is found. Then the laser frequency is set below that frequency, by an amount sufficient to drop to half transmission. At this new fixed input frequency, designated as $V_{-\frac{1}{2}}$, the title angle $\theta$ is adjusted, to maximize the etalon transmission. Now, the tilting to larger input angles carries the etalon peak frequency $V_E$ away from $V_{-\frac{1}{2}}$, making the transmission maximum a sensitive, unambiguous detector of the $\theta=0$ condition. In fact, eq. (27) of Born and Wolf can be manipulated to show that the transmission as a function of $\theta$ at this input frequency becomes:

$$T(V_{-\frac{1}{2}}, \theta) = T_{max}\left(\frac{1}{1 + (1 + mF\theta^2)^2}\right) \tag{2}$$

where $m = 2h/\lambda$ (order number of the etalon) $\simeq 77,000$ in the VET 66, and h = (etalon spacing).

From this equation, if the detected transmission signal can be set, by axial 85 and transverse axis 87 tilt adjustments, to within 2% of its maximum value, then the incidence angle $\theta$ is less than 0.2 mr. This is an improvement (reduction) of the cosine error by a factor of 1/25 over that of the conventional means, for the present etalon, used as an example.

Since the VET 66 is the most sensitive angle detector in the wavemeter, the OAM 68 and VET 66 are mounted with common tilt axes 85, 87. Thus minimizing the cosine error for the VET 66 measurement automatically minimizes the cosine error of the OAM 68 as well.

Let d be the length of the short spacer 76, D the longer spacer 74 and $\Delta d = D - d$. The free spectral ranges of the two etalons are $(c/2d) = 6.78$ GHz and $(c/2D) = 6.49$ GHz. If at some frequency the transmission peaks coincide, as the frequency is scanned higher, the frequency interval measured from the D peak to the d peak increases by the difference of the two FSR's for each frequency increment of the smaller FSR. The two peaks will again coincide after a frequency change of the free-spectral range of the vernier, or $(c/2d) = 150$ GHz. This frequency interval defines the VET order. It should be noted, however, that it is not necessary for the respective peaks to exactly coincide; the peak spacing from one channel to the next is still proportional to their positions within the free spectral range of the vernier.

Within one VET order, the frequency is uniquely determined by a short 10 GHz scan, wide enough to give the relative spacings of the peaks of the two channels, and the fractional order of one of them. This is the "vernier" principle. Use is made of digital filtering and statistical averaging techniques in the computer 46 to achieve a readout of the VET 66 channels to 60 MHz resolution or 1% of the FSR of one channel. See Appl. Opt. 19, Apr. 15, 1980, p. 1223 by J. J. Synder. Detectors 88 and 90 (FIG. 2) read a signal representative of the light transmitted through the etalons 84 and 86 to computer 46 via lines 92 and 94 respectively.

Figure 4:
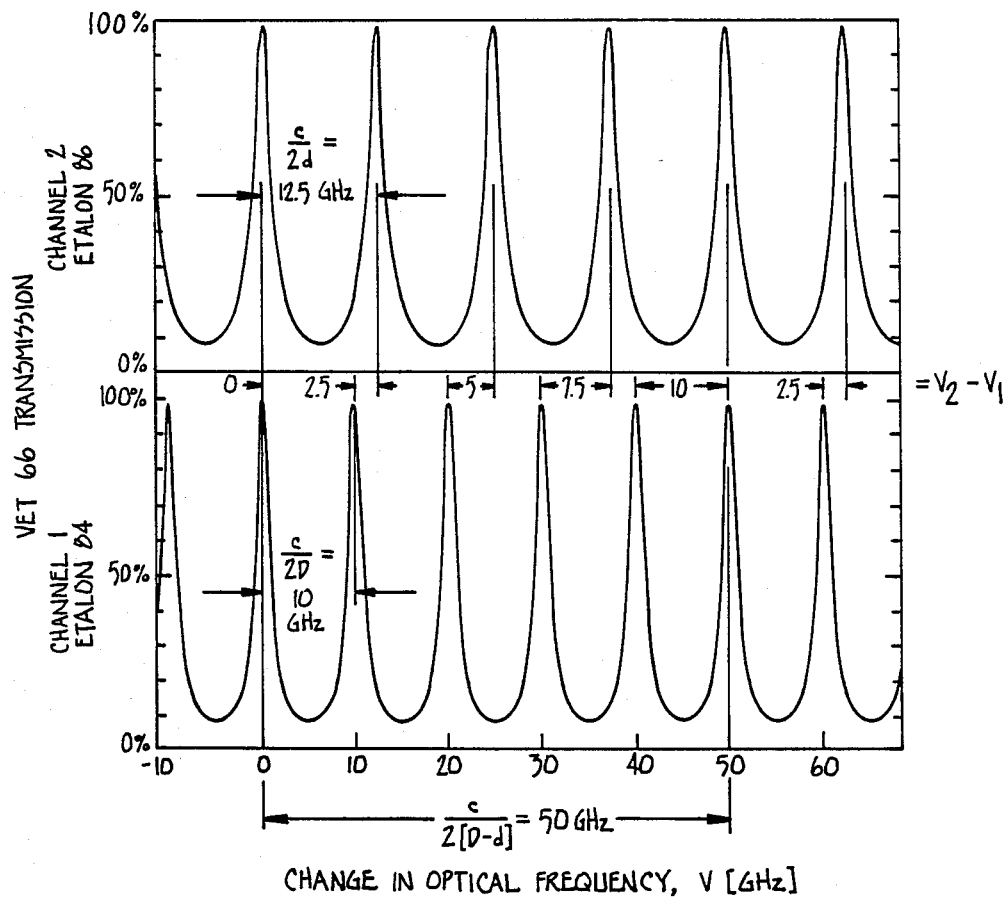
FIG. 4 is a graph illustrating the light transmission characteristics of the vernier etalon of FIG. 3 as a function of light frequency.

As an example and for purposes of illustration the transmission functions are shown in FIG. 4 for a hypothetical etalon pair 34 and 86 having a 25% spacing difference, of 10 and 12.5 GHz free spectral ranges. (Note that the actual etalon FSR's are 6.5 and 6.8 GHz, a 5% difference.) Plotted also is the frequency spacing, measured by a short frequency scan, from a peak of Channel 1, etalon 84, to the next-higher frequency peak of Channel 2, etalon 86, in successive orders of the Channel 1 (c/2D) etalon. This difference increases linearly with order number and identifies in a nonredundant fashion which c/2D order the short scan contains, within the repeat spacing c/2(D-d) of the vernier etalon 66. The final frequency value for the start of the short scan is then computed by computer 46 from the location of the Channel 1 peak within the scan.

To select between VET 66 orders, a coarse wavelength readout with resolution to $<1.5 \times 10^{-4}$ is needed. This is achieved with the optical activity monochromator (OAM) 68, shown in FIG. 2. Two bars 96 and 98 of Z-cut quartz crystal produce a rotation R of the direction of polarization of beams 42' and 42" respectively. This rotation is due to the optical activity of the quartz crystal, for light propagating along the Z-axis.

Figure 5:
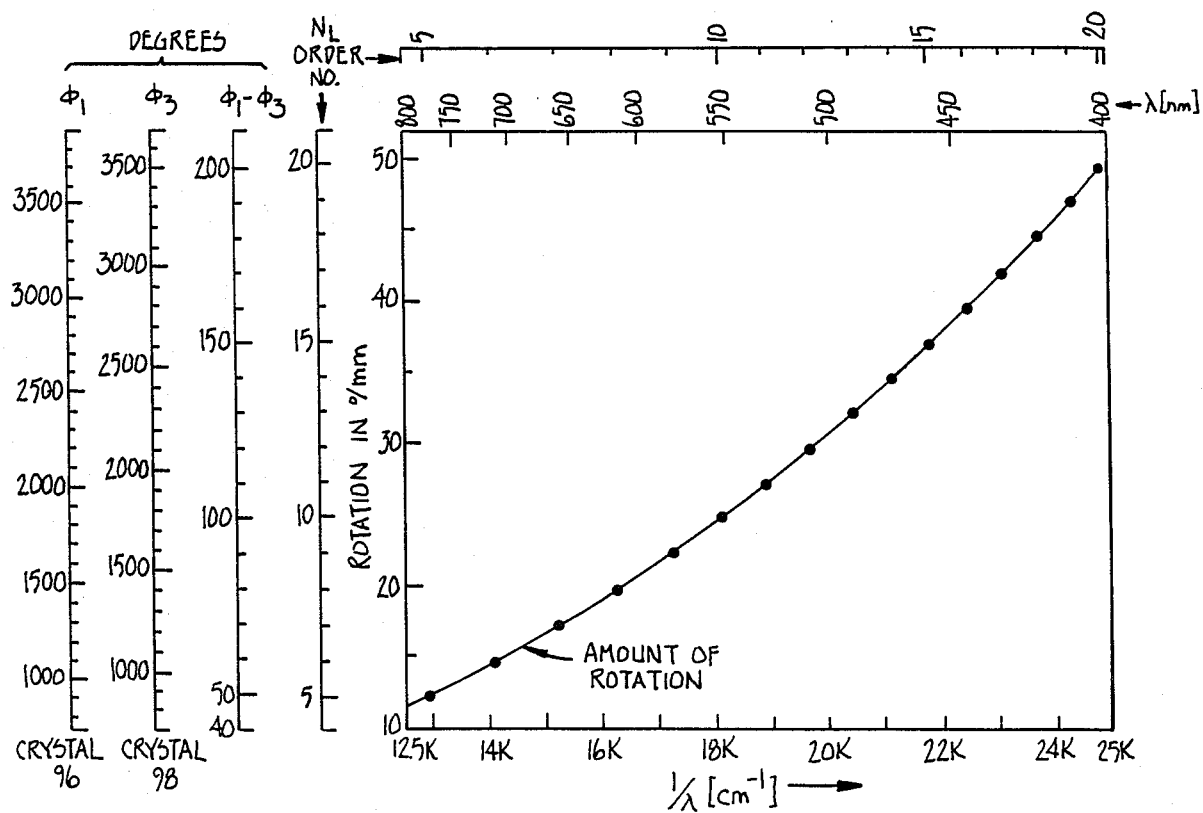
FIG. 5 is a graph which relates the amount of polarization rotation of the light beam passing through the coarse read out element of the wavemeter, with the wavelength of the light.

The rotation, in degrees per millimeter of the direction of polarization, of the linearly polarized input beams 42' and 42" traversing optically-active quartz crystal pieces 98 and 96 is shown in FIG. 5 as a function of wavelength and wavenumber. In one embodiment, the two crystals 98 and 96 used in the OAM are 70 and 74 mm in length, giving the total rotation angles $\phi 3$ and $\phi 1$, respectively, shown on the left-hand axis. These range from 850 to 3700 degrees over the visible spectrum. With the angular resolution of 0.05°, obtained in the OAM 68 with statistical averaging of the signal waveform, measurement of either angle gives a coarse wavelength value of precision $<1 \times 10^{-4}$. This is sufficient to specify the order number of the vernier etalon 66, the high resolution part of the wavemeter 45.

To assign the order of the OAM 68, use is made of the difference in the polarization rotations through the two different lengths of crystal 96 and 98. By "order" it is meant the number of redundant, i.e. 180° polarization rotations, of the light through a crystal. The two beams 42' and 42" which pass through crystal bars 96 and 98 are reflected by fold mirrors to cross on a spinning polaroid wheel 104 at 102, which rotates at 30 Hz. This results in sinusoidal waveforms which are detected by detectors 106 and 108 after being reflected by fold mirror 110. Since the crystals are of different lengths the amount of rotation of the two beams will be different. Consequently the resulting sinusoidal waveforms detected will be out of phase in accordance with this rotational difference. The signals from detectors 106 and 108 are sent to the computer 46 via lines 112 and 114 respectively.

The exact position of the spinning polaroid wheel 104 is precisely monitored. One way to do this is to use a suitable timing mark or flag 116 placed at a single position on the circumference of wheel 104. A sensor 118 sends a signal via line 120 to the computer 46. Computer 46 then determines the polarization angles $\phi 3$ and $\phi 1$ of the beams through crystals 98 and 96.

The rotation angles directly measured with the spinning polaroid wheel 104 lie between 0° and 180°. The crystals 98 and 96 are made long enough that the total polarization rotation of either beam is thousands of degrees, in order to achieve the desired $<1 \times 10^{-4}$ resolution. Thus the number of 180° multiples in each of the total rotations must be determined, and added to the directly measured angles, to get the correct values of $\phi 1$, $\phi 3$. This is done by choosing the difference in lengths of the two crystals 98 and 96 to be 4 mm.

Then over the wavemeter measuring range of 400-800 nm, the difference $\phi 1 - \phi 3$ varies less than 180° and its value uniquely determines the number of redundant 180° rotations, in each of $\phi 1$, $\phi 3$ individually.

By analogy with a clock, where the wavelength is like the time of day, the angle $\phi 1 - \phi 3$ is the "hour-hand" giving the approximate number of hours into the day that the time has elapsed, and either of $\phi 1$ or $\phi 3$ is a "minute-hand" giving more accurately the fraction of time elapsed since the last full hour. The composite of both "hands" then gives the most accurate time, e.g. coarse wavelength value.

For the 74 mm length chosen for the longest crystal 96, the total rotation $\phi$, changes from 870° at 800 nm to 3850° at 400 nm. This is a span of 2980°, which included 16 multiples of 180°, or a change of 16 in the number over the visible portion of the spectrum. Thus, at 800 nm, there are four redundant 180° rotations in $\phi 1$, the directly measured angle is $870° - 4 \times 180° = 150°$, and the long crystal 96 order number $N_L$ is 4.

This is indicated in FIG. 5 by the horizontal and vertical scales labeled "$N_L$, order number", the value of "amount of rotation" curve at 800 nm (12,500 cm$^1$) intersects these scales at a value of $870° \div 180° = 4.8$, still in the 4th order. The long-crystal order number changes at the points marked by dots along the "amount of rotation" curve. At 400 nm the directly measured angle is $3850° - 21 \times 180° = 70°$, and $N_L = 21$. Thus the 2980° change in $\phi$, over the visible includes 16 multiples of 180°, or a change in order number of 16 (16 dots on the "amount of rotation" curve).

The difference in rotation angles, $\phi 1 - \phi 3$, the "hour-hand", changes by about 160° over this wavelength span, as shown in FIG. 5. This change is unambiguous as to 180° multiples. This variable always is in its "zeroth order" or first 0° to 180° span, and changes in the order $N_L$ of the long crystal, are indicated by increments of about 10° in the value $\phi 1 - \phi 3$.

In summary, the wavemeter 45 is used by computer 46 to determine the coarse wavelength readout by utilizing the non-redundant difference of polarization rotation of the beams passing through the two crystals 96 and 98 of the OAM 68 to assign an order number, $N_L$, for the observed polarization rotation through crystal 96. This then allows resolution of the wavelength of $6 \times 10^{-5}$. The VET 66 is used to determine the fine wavelength readout to a resolution of $<4 \times 10^{-7}$.

The continuous scans of up to 10 THz, provided by dye laser 10 require computer 46 to precisely piece together multiple short segments or incremental frequency scans. As explained, it is conventional for dye laser 10 to be automatically scanned up to 30 GHz, a very limited scan range. Appropriate drive signals to the thin etalon 36, thick etalon 34, and Brewster plate 30 generated by the controller 58 provides this scanning capability. Conventionally, scanning beyond this 30 GHz range involves a manual, incremental rotation of the thin etalon 36 and birefringent filter 32 at the end of a 30 GHz scan segment.

After a set of scan segments adding up to a free-spectral range of the thin etalon, typically >200 GHz, the thin etalon rotation is reset to near zero incidence angle. Conventionally, setting and resetting the thin etalon 36 and the birefringent filter is not done automatically.

Heretofore, manual resetting of the thin etalon 32 and birefringent filter 32 has been time-consuming and inaccurate, resulting frequently in gaps in the frequency spectrum.

The present invention overcomes these problems. Very long, linear scans are achieved by linking short, incremental scans, at the ends of which the frequency scanning elements, e.g. the thick etalon 34, the thin etalon 36, and the birefringent filter, are set or reset automatically under the control of computer 46. In order to insure alignment of the end-points of the scan segments, stable, preferably linear local-frequency reference marks are required. The vernier etalon 66 of the wavemeter 45 performs this task ideally. By utilizing the VET 66 as a reference frequency mark, under control of computer 46, end scan segment errors do not accumulate and the linearity of long scans is as good as that of the incremental 10 GHz segments.

More specifically, the computer controls the resetting of the thick etalon 34 after each 10 GHz scan. The thin etalon 36, also under control of computer 10, is reset for the next thick etalon 34 scan. The VET 66 is used as the local frequency mark. Unlike previous scannable lasers, the thin etalon 36 and the birefringent filter 32 are provided with position servo systems 50 and 54 respectively, which detect the light reflected from these elements as described previously, under the control of computer 10. This allows the computer to monitor and control these two elements while it is "stacking" incremental scans.

In addition to performing the logic sequence to make this occur, the computer 46 also aligns, to the current wavelength, the peak transmission wavelengths of the two elements of the filter stack, thin etalon 36 and birefringent filter 32. This "filter-stack housekeeping" is done at selected intervals (about every 90 GHz) within the scan. Photodetectors are placed to measure the reflected beams off these elements and the computer 46 has routines which minimize these reflection losses, thus keeping these elements tracking over long scans. During scanning, the computer digitizes and stores 1 to 3 channels of data at scan increments adjustable from 1 MHz to 10 GHz, with total data storage of 64K bytes. The scannable laser system 10 also moves the laser wavelength to any particular command wavelength, within the spectrum of that dye by adjusting the tuning elements and interrogating the wavemeter 45 until the output wavelength matches the desired wavelength.

The computer 46 in addition has a "mode-jump" (frequency discontinuity) correcting routine. Because of the automatic relocking design of the laser system 10, the only time a frequency jump is likely to occur in the laser is during the short time periods when the frequency servo-loop control elements are saturated, such as at the 1 ms period at the end of a 10 GHz scan segment, when the thick etalon 34 mode-jump is induced to reset for the next scan segment. The computer corrects for such possible frequency offsets, by interrogating the VET 66 to locate the actual frequency at the beginning of each scan segment. This is used to align the initial frequency of the next incremental segment to within the precision of the VET 66 readout, of about 60 MHz. When the data increment interval is set to less than 50 MHz, the ends of the scan segments are overlapped 50 MHz, and the overlap region indicated by double ticmarks on the frequency axis of the output display, to insure no loss of data.

The computer software 46 structure begins with machine language subroutines which are called by the BASIC control structure. The system operator converses with the system through an operating language instead of a menu-option selection system. This operating language executes a command either immediately, or defers execution until called as part of a sequential set of commands by typing a line number before the commands.

We claim:

1. A computer-controlled frequency scannable laser system comprising:
    a laser;
    a wavelength meter for measuring the operating frequency of the laser; and
    computer control means connected to and controlling said laser and said wavelength meter and functioning to construct a long composite scan from shorter incremental scans, wherein at the start of each incremental scan, the start-of scan frequency is measured with the wavelength meter and is adjusted by the computer control means to equal the end-of-scan frequency of the previous incremental scan.

2. The laser system of claim 1 wherein said computer control means further functions to set the start-of-scan frequency to equal the end-of-scan frequency of the previous incremental scan, less an amount equal to the accuracy with which the laser's operating frequency can be measured, so that incremental scans overlap in the composite scan by this amount to ensure no gaps in frequency coverage in the composite scan.

3. The laser system of claim 1 wherein said computer control means further functions to repeat the previous incremental scan if the difference between the measure start-of-scan frequency and the end frequency of the previous incremental scan exceeds a preset value large enough to indicate that a frequency error in the previous incremental scan has occurred.

4. The laser system of claim 1 wherein said computer control means continuously monitors the continuity of the frequency reading from the wavelength meter during an initial incremental scan and repeats and replaces said initial incremental scan in the composite scan, if the monitored wavelength meter frequency reading contains a step discontinuity.

5. In a wavemeter, having a fixed frequency reference etalon for wave-length readout of a frequency scannable laser, means for accurately aligning the angle of the input beam being measured along the etalon axis, comprising:
    a fixed frequency reference etalon;
    means for coarsely aligning the input beam with etalon;
    means for scanning the frequency of the input beam over a frequency range greater than the free spectral range of the reference etalon to locate the frequency of an etalon peak;
    means for setting the frequency of the input beam at about one-half of one reference etalon full width at half maximum below the located peak frequency; and
    means for adjusting the relative angle between the etalon axis and the input beam to maximize the transmission through said reference etalon.

6. In a frequency scannable laser, a stable frequency reference element formed of a pair of etalons, comprising:
    two adjacent spacers, one of said spacers having a length D and the other d, where $d<D$, and wherein one end of said two spacers form a common face at the input end of said reference element;
    a mirror affixed at the common face of said two spacers to form a common mirror surface;
    end mirrors bonded at the opposite ends of each of said spacers; and
    means for enclosing the assembly formed by said spacers and mirrors in a pressure-sealed, constant-temperature environment.

7. In an integrated system including a wavemeter, a scannable laser, including a filter stack and computer controlled elements thereof, means for eliminating limits to the scan range due to accumulated filter-stack misalignment errors by eliminating tracking error of each filter stack element subject to error comprising:
    means to halt the frequency scan at predetermined frequency intervals;

means to adjust the least coarse filter stack element frequency over predetermined limits, both above and below the initial frequency setting;

means to thereafter detect the transmission loss of said least coarse filter stack element;

means to set the frequency of said least coarse filter stack element at a value which produces the lowest loss detected by said detection means;

means for repeating the above procedure for the remaining elements of the filter stack, going from least to most coarse; and means for resuming the scan.

8. The computer-controlled frequency scannable laser system of claim 1 wherein said computer control means further functions to linearize the successive frequency intervals at which data samples are taken during a frequency scan by (a) computing the nonlinearities or differences between the commanded frequency and the actual frequency obtained in an incremental scan, by comparison to said wavelength meter reading or by comparison to some other, external frequency reference; and (b) correcting to a linear change in frequency for each successive data taking interval in the incremental scan, by application of an appropriate time delay for the time to next sample that data computed from (a).

9. In a computer-controlled frequency scannable laser system in which a computer sets the drive variables for the elements of a tunable filter stack that selects and scans the laser's operating frequency, said system including a vernier-etalon frequency reference element formed from a long etalon of known spacer length D and a short etalon of known spacer length d, the two etalons sharing one common end mirror;

a coarse wavelength measurement means that defines the laser's operating frequency with a frequency resolution finer than c/2, where c is the velocity of light, sufficient to define the operating order number of the vernier etalon, and including means to assign the operating order numbers for the transmission peaks of the long and short etalons lying within the vernier etalon operating order frequency span, comprising:

(a) means for scanning the laser frequency within said vernier order frequency span over an interval that includes a transmission peak of the long etalon and the next neighboring transmission peak of the short etalon, and from the values of the scan drive variable for these two peaks, computing the frequency difference between these two transmission peaks, called the measured frequency difference;

(b) means for computing from the known lengths D and d and the known operating vernier etalon order number, the possible difference frequencies of neighboring long and short etalon transmission peaks for all pairs of neighboring peaks lying within the frequency span of the operating vernier etalon order, called the set of calculated frequency differences; and (c) means for comparing the measured frequency difference with the set of calculated frequency differences and assigning to the pair of transmission peaks whose difference frequency was measure, the order numbers of the pair of transmission peaks form the set of calculated difference frequencies which gives the closest match.

10. In a wavemeter for wavelength readout of a frequency-scannable laser, means for providing a coarse value of wavelength comprising:

an input polarizer which acts upon a beam of light from said scannable laser to provide a beam of light linearly polarized at a known polarization orientation;

a first length of crystal having an optically-active axis along which the polarized light beam passes;

means for determining the angle of rotation of polarization after the polarized light beam passes through said first length of optically-active crystal; and means for determining the wavelength of the beam of light based upon the amount of angular rotation of polarization.

11. A wavemeter as in claim 10 wherein said input polarizer is a beamsplitter at approximately Brewster's angle of incidence.

12. A wavemeter as in claim 11 wherein said length of optically-active crystal is quartz cut for propagation of the light beam along the optic axis.

13. A wavemeter as in claim 10 including:

a second length of optically-active crystal having an axis along which passes a beam of light from said input polarizer, the length of said second crystal being longer than that of the first and chosen such that the difference of the polarization rotation of the light beam through the second crystal, minus the polarization rotation through said first crystal, changes by less than 180° over the wavemeter measurement range;

means for utilizing the polarization rotation difference through said first and second crystals to determine the order number, $N_L$, for said second crystal; and means for computing the total polarization rotation through said second crystal as $N_L \times \frac{1}{2}° +$ measured polarization rotation angle; said wavelength being determined by said wavelength determining means.

14. A wavemaker as in claim 10 including a second length of optically-active crystal having an axis along which passes a beam of light from said polarizer, the length of said second crystal being shorter than that of the first and chosen such that the polarization rotation of the light beam through the second crystal changes by less than 180° over the range of wavelengths to be measured:

means for utilizing the polarization rotation through said second crystal to determine the order number, $N_L$, for said first crystal; and means for computing the total polarization rotation through said first crystal as $N_L \times 180° +$ the measured polarization rotation angle; said wavelength being determined by said wavelength determining means.

15. In a computer-controlled scannable laser system, said laser system having:

a laser;

a tunable filter stack that selects and scans the laser's operating frequency and in which the computer sets the drive variables for the elements of the tunable filter stack, said filter stack including a scanning etalon, whose operating order is selected by a next-coarsest resolution element in the filter stack;

a reference etalon of known fixed spacing giving transmission peaks monitored by the computer during a scan at known reference frequency values; and means to construct long composite frequency scans from shorter incremental frequency scans, wherein before beginning the next incremental scan after a preceding incremental scan, the operating order of the scanning etalon is mode-jumped to an adjacent order, by computer adjustment of the next-coarsest element drive variable, to approximately set the next incremental scan start frequency;

wherein the improvement of the present invention comprises the steps of:

(a) running a check scan under computer control to locate the scan drive value of a known reference etalon peak and computing from this and the known scan drive value at the start of scan, the present start-of-scan frequency;

(b) computing an adjustment to the scan drive value and adjusting to the new value to set the start-of-scan frequency equal to the end frequency of the previous incremental scan;

(c) running a second check scan under computer control to locate again the same reference etalon peak and to confirm that the start-of-scan frequency is equal to the end frequency of the previous incremental scan;

(d) scanning the nest incremental scan in the composite scan;

(e) mode-jumping the operating order of the scanning etalon to an adjacent order and repeating the steps (a) through (e) until the composite scan is completed.

16. The method of claim 15 including the additional step that if in step (c) the start-of-scan frequency does not equal the end frequency of the previous incremental scan, then steps (a) through (c) are repeated.

17. The method of claim 15 wherein in step (b), the start-of-scan frequency is set equal to the end frequency of the previous incremental scan, less an amount equal to the accuracy with which the reference etalon peak can be located, so that incremental scans overlap in the composite scan by this amount to ensure no gaps in frequency coverage in the composite scan.

18. The method of claim 15, including the additional step of repeating the previous incremental scan before proceeding to complete the remainder of the composite scan if the adjustment of frequency to set the start-of-scan frequency in step (b) exceeds a preset value large enough to indicate that a frequency error in the previous incremental scan has occurred.

* * * * *